UNITED STATES PATENT OFFICE 2,389,153

MANUFACTURE OF TRITHIO ORTHO ESTERS OF CARBOXYLIC ACIDS

John David Kendall, Ilford, England, assignor to Ilford Limited, Ilford, England, a company of Great Britain No Drawing. Application March 24, 1943, Serial No. 480,333. In Great Britain April 20, 1942

9 Claims. (Cl. 260—455)

This invention relates to the manufacture of ortho esters and particularly to the manufacture of trithio ortho esters of carboxylic acids.

The esters of trithio-orthoformic acid

where R is a hydrocarbon group) can be readily prepared by the condensation of formic acid or formic esters with mercaptans in the presence of hydrochloric acid as condensing agent. This method fails when applied to acids other than formic acid.

The usual method of making ortho-esters is the action of an alcohol on an imino-ether hydrochloride but an analogous process for producing trithio ortho esters based on the use of a mercaptan instead of an alcohol entirely fails. Thus, acetimino-thio-ethyl ether hydrochloride is completely unaffected by weeks of treatment with ethyl mercaptan.

No general method has hitherto been described for producing tri-thio ortho esters of acids other than formic acid and it has now been discovered, and this forms the basis of the present invention, that trithio-ortho esters of such other acids may be prepared by a general process which consists in the condensation of a mono-thio-ester of the general Formula 1

$$R_1.CO.SR_2 \qquad (1)$$

(where $R_1$ and $R_2$ are each a hydrocarbon group or a substituted hydrocarbon group) with a mercaptan, in the presence of a strong dehydrating agent.

The best results have been obtained using anhydrous zinc chloride as the dehydrating agent but other dehydrating agents such as sulphuric acid may be employed, though such other agents generally give much smaller yields than anhydrous zinc chloride.

The course of the reaction may be illustrated by the following equation:

where $R_1$ and $R_2$ have the meanings assigned to them above and $R_3$ is a hydrocarbon group.

The mono-thio-ester of general Formula 1 may be prepared by any of the known processes, e. g. by interaction of an acid halide with a mercaptan according to the equation:

$$R_1.CO.X + R_2SH \rightarrow R_1.CO.SR_2 + HX$$

(where X is a halogen atom). In this reaction no condensing agent need be employed. However, since this reaction is also effected by treatment with a mercaptan it is possible, where it is desired to produce a trithio ortho ester in which the ester radicals are all of the same character, to carry out the whole reaction in one stage, without isolating the mono-thio-ester. Thus one molecular equivalent of the acid halide (preferably the acid chloride) may be condensed with three molecular equivalents (or more) of the mercaptan in the presence of a strong dehydrating agent such as anhydrous zinc chloride, according to the equation:

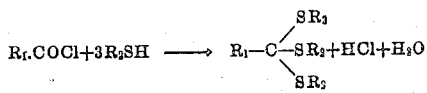

Again, instead of using the acid halide, the original acid may be employed, $R_1.COOH$.

In both the processes described in the preceding paragraph it is believed that the mono-thio-ester $R_1.COSR_2$ is formed as an intermediate and both these processes are therefore to be considered as falling within the scope of the present invention.

The reaction may be effected using all types of mercaptans, for example, alkyl, aralkyl and aryl mercaptans, and the invention may be applied to the production of the trithio-ortho esters of both aliphatic and cyclic and both saturated and unsaturated carboxylic acids. In the case of the unsaturated acids it is preferable first to prepare the trithio-ortho ester of a saturated acid containing readily removable substituents which on removal leave the desired unsaturated acid. Thus, to obtain the trithio-ortho ester of acrylic acid it is preferable to start with β-chlorpropionic acid and prepare the trithio-ortho ester of such acid, subsequently removing the elements of hydrochloric acid to convert the β-chlor-propionic residue to an acrylic residue.

By employing an original acid or acid halide which contains more than one carboxyl or carboxylic halide group, e. g. malonic or succinic acids or acid chlorides and higher homologues of this series, products may be obtained which contain more than one trithio ortho ester group.

The term "acid halide" when referring to the acid halide of an organic carboxylic acid in the specification and claims means compounds which have a hydrocarbon radical attached to one, two, etc., radicals of the formula

wherein X is a halogen atom. In the case of the monocarboxylic acid chlorides such compounds have the formula

where $R_1$ has the above significance.

The following examples illustrate the invention but are not to be regarded as limiting it in any way.

EXAMPLE I

*Preparation of trithio ethyl-ortho-acetate*

100 ccs. of ethyl mercaptan was mixed with 23.5 ccs. of acetyl chloride, the reaction mixture being cooled in an ice bath. About 5 gms. of anhydrous zinc chloride was added and this promoted a vigorous reaction with the evolution of hydrochloric acid gas. Further zinc chloride was then added to a total of 90.5 gms. and the mixture was allowed to stand for 24 hours with occasional shaking. The mixture was then poured into 150 ccs. of an ice/water mixture. Zinc chloride remaining in the reaction vessel was dissolved in a little dilute hydrochloric acid and added to the ice/water mixture. A layer of oil separated out and this was removed and extracted with successive lots of ether. The combined ether extracts were washed with water, and with 10% sodium carbonate solution and dried over potassium carbonate. The ether was then removed from the dried extracts by evaporation on a water bath and the dry residue was distilled in vacuo. The product was obtained as a liquid boiling at 121° C. at 10 mm. pressure.

The same product was obtained, though in smaller yield, by reacting 100 ccs. of mercaptan, 18 ccs. of acetic acid and 90.5 gms. of zinc chloride. The mixture was allowed to stand for 24 hours and the product separated as before.

EXAMPLE II

*Preparation of trithio ethyl-ortho-propionate*

This compound was prepared by a process similar to that in Example I using 8.7 ccs. of propionyl chloride, 30 ccs. of ethyl mercaptan and 27.2 gms. of anhydrous zinc chloride. The product was obtained as a liquid boiling at 141° C. at 13 mm. pressure.

EXAMPLE III

*Preparation of trithio ethyl-ortho-benzoate*

This compound was prepared by a process similar to that of Example I using 11.6 ccs. of benzol chloride, 30 ccs. of ethyl mercaptan and 27.2 gms. of anhydrous zinc chloride. The product was obtained as a liquid boiling at 188° C. at 12 mm. pressure.

EXAMPLE IV

*Preparation of mono-ethyl-dibenzyl-trithio-ortho-acetate*

7.06 ccs. of acetyl chloride and 7.2 ccs. of ethyl mercaptan were mixed together and refluxed on a water bath for three hours. Ethyl thio acetate, boiling at 116° C. was then separated from the reaction mixture by distillation.

11.4 gms. of ethyl-thio-acetate as thus prepared was mixed with 28.5 ccs. of benzyl mercaptan and 29.8 gms. of anhydrous zinc chloride was carefully added. The reaction mixture became warm and gradually thickened. After allowing the mixture to stand for 48 hours it was poured into an ice/water mixture whereupon the product separated as an oily layer. This was purified as in Example I and the product was thus obtained as a dark red oil boiling at 210–215° C. at 15 mm. pressure with some decomposition.

EXAMPLE V

*Preparation of trithio-ethyl-ortho-acrylate*

51 gms. of β-chlorpropionyl chloride and 133 ccs. of ethyl mercaptan were heated together for 3 hours. The mixture was then cooled and 109 gms. of anhydrous zinc chloride were gradually added. The mixture was then allowed to stand for 24 hours during which time it thickened to a yellow oil. This was poured into an ice/water mixture and the product which separated was purified as in Example I. This product consisted mainly of trithio-ethyl-ortho-β-chlor propionate and had a boiling range from 140–160° C. at 10 mm. pressure.

10.7 gms. of sodium was dissolved in 160 ccs. of ethyl alcohol and the cooled solution was mixed with 60 gms. of trithioethyl ortho-β-chlor propionate prepared as above. The reaction mixture became warm and sodium chloride separated. The mixture was heated on a water bath for one hour and was then cooled and poured into 500 ccs. of an ice/water mixture. The product separated as an oily layer and this layer was extracted with ether and the ether extracts were washed with water and dried over anhydrous sodium sulphate. The ether was then evaporated and the residue distilled in vacuo yielding the desired tri-thio-ethyl-ortho-acrylate as a yellow oil boiling at 149–150° C. at 10 mm. pressure.

EXAMPLE VI

*Preparation of bis-trithio ethyl ortho succinate*

31 gms. of succinyl chloride and 120 ccs. of ethyl mercaptan were mixed with cooling (using an ice-salt freezing mixture) and the reaction solution was allowed to stand for 24 hours, protected from atmospheric moisture by means of calcium chloride guard tubes. 109 gms. of anhydrous zinc chloride was then added cautiously with cooling and the mixture allowed to stand for a further 48 hours. It was then poured onto cracked ice to which some dilute hydrochloric acid had been added. The prepicitated oil was separated by ether extraction; the ether extracts were washed with water and 10% sodium carbonate solution, and then dried over anhydrous potassium carbonate. The ethereal solution was concentrated and the residue distilled in vacuo, yielding the product as a yellow oil having boiling point 222° C. at 15 mm. pressure.

EXAMPLE VII

*Preparation of bis-trithio ethyl ortho adipate*

18.3 gms. of adipyl chloride was mixed (with cooling in an ice-salt freezing mixture) with 60 cc. of ethyl mercaptan. After allowing to stand overnight, 54.4 gms. of anhydrous zinc chloride was cautiously added in small portions with cooling and the reaction mixture allowed to stand for 24 hours. By the same procedure as in Example VI the product was obtained as a yellow oil having boiling point 260° C. at 12 mm. pressure.

EXAMPLE VIII

*Preparation of bis-trithio ethyl ortho malonate*

14.1 gms. of malonyl chloride and 60 cc. of ethyl mercaptan were mixed with good cooling and allowed to stand for 24 hours. 54 gms. of anhydrous zinc chloride was added in portions, at 0° C., and the reaction mixture allowed to stand for 56 hours. By the same treatment as in Example VI the product was obtained as a yellow oil having boiling point 150–5° C. at 5 mm. pressure.

The trithio ortho-esters produced according to the present invention are useful as intermediates in the production of other organic compounds, for example they may be oxidised to the corresponding sulphones.

What I claim is:

1. Process for the production of a trithio ortho ester of an organic carboxylic acid having an unsubstituted saturated hydrocarbon radical attached to the carbonyl group which comprises condensing a mono thio ester of the said acid with a mercaptan in the presence of a strong inorganic dehydrating agent.

2. Process for the production of a trithio ortho ester of an organic carboxylic acid having an unsubstituted saturated hydrocarbon radical attached to the carbonyl group which comprises condensing a mono thio ester of the said acid with a mercaptan in the presence of zinc chloride.

3. Process for the production of a trithio ortho ester of an organic carboxylic acid having an unsubstituted saturated hydrocarbon radical attached to the carbonyl group which comprises condensing an acid halide of the said acid with at least three molecular equivalents of a mercaptan in the presence of a strong inorganic dehydrating agent, whereby a mono-ester of the said acid is formed in situ and reacts with further mercaptan to produce the desired trithio ortho ester.

4. Process for the production of a trithio ortho ester of an organic carboxylic acid having an unsubstituted saturated hydrocarbon radical attached to the carbonyl group which comprises condensing an acid halide of the said acid with at least three molecular equivalents of an alkyl mercaptan in the presence of a strong inorganic dehydrating agent, whereby a mono-ester of the said acid is formed in situ, and reacts with further alkyl mercaptan to produce the desired trithio ortho ester.

5. Process for the production of a trithio ortho ester of an organic carboxylic acid having an unsubstituted saturated hydrocarbon radical attached to the carbonyl group which comprises condensing an acid chloride of the said acid with at least three molecular equivalents of a mercaptan in the presence of a strong inorganic dehydrating agent, whereby a mono-ester of the said acid is formed in situ and reacts with further mercaptan to produce the desired trithio ortho ester.

6. Process for the production of bis trithio ortho ester of dicarboxylic acids having an unsubstituted saturated hydrocarbon radical attached to the carbonyl groups, which comprises condensing an acid halide of said acid with at least six molecular equivalents of a mercaptan in the presence of a strong inorganic dehydrating agent, whereby a bis mono thio ester of the said acid is formed in situ and reacts with further mercaptan to produce the desired bis trithio ortho ester.

7. A process for the production of trithio-ethyl-ortho-acetate which comprises condensing acetyl chloride with at least three molecular equivalents of ethyl mercaptan in the presence of anhydrous zinc chloride, whereby a monothio ester of acetic acid is formed in situ and reacts with further ethyl mercaptan to produce trithio-ethyl-ortho-acetate.

8. A process for the production of trithioethyl-ortho-propionate which comprises condensing propionyl chloride with at least three molecular equivalents of ethyl mercaptan in the presence of anhydrous zinc chloride, whereby a monothio ester of propionic acid is formed in situ and reacts with further ethyl mercaptan to produce trithioethyl-ortho-propionate.

9. A process for the production of bis-trithio-ethyl-ortho-succinate which comprises condensing succinyl chloride with at least three molecular equivalents of ethyl mercaptan in the presence of anhydrous zinc chloride, whereby a thio ester of succinic acid is formed in situ and reacts with further ethyl mercaptan to produce bis-trithioethyl-ortho-succinate.

JOHN DAVID KENDALL.